United States Patent
Garnaga et al.

(10) Patent No.: US 12,334,097 B1
(45) Date of Patent: Jun. 17, 2025

(54) SYSTEMS AND METHODS TO IMPROVE AUTOMATIC SPEECH RECOGNITION OF AUDIO DATA

(71) Applicant: Suki AI, Inc., Redwood City, CA (US)

(72) Inventors: Valerii Garnaga, San Jose, CA (US); Vamsi Reddy Chagari, Livermore, CA (US); Ajithkumar Warrier, Fremont, CA (US); Jian Feng, Snoqualmie, WA (US); Mona Abdul-Azeez Sheikh, Redwood City, CA (US)

(73) Assignee: Suki AI, Inc., Redwood City, CA (US)

( * ) Notice: Subject to any disclaimer, the term of this patent is extended or adjusted under 35 U.S.C. 154(b) by 284 days.

(21) Appl. No.: 17/965,276

(22) Filed: Oct. 13, 2022

(51) Int. Cl.
| | |
|---|---|
| *G10L 15/26* | (2006.01) |
| *G10L 15/06* | (2013.01) |
| *G10L 15/22* | (2006.01) |
| *G10L 21/0216* | (2013.01) |
| *G10L 21/0264* | (2013.01) |

(52) U.S. Cl.
CPC ........ *G10L 21/0264* (2013.01); *G10L 15/063* (2013.01); *G10L 15/22* (2013.01); *G10L 15/26* (2013.01); *G10L 21/0216* (2013.01); *G10L 2015/0635* (2013.01)

(58) Field of Classification Search
CPC .............. G10L 21/0264; G10L 15/063; G10L 15/22; G10L 15/26; G10L 21/0216; G10L 2015/0635; G10L 25/60; G10L 25/84; G06N 3/045; G06N 3/08; G06N 3/088
USPC ........................................................ 704/233
See application file for complete search history.

(56) References Cited

U.S. PATENT DOCUMENTS

| | | | |
|---|---|---|---|
| 2019/0130903 A1* | 5/2019 | Sriram ................. | G10L 15/063 |
| 2020/0104357 A1* | 4/2020 | Bellegarda ............ | G06F 40/232 |
| 2021/0005216 A1* | 1/2021 | Chen ....................... | G10L 25/30 |
| 2021/0089909 A1* | 3/2021 | Binkowski .............. | G06N 3/08 |
| 2022/0279874 A1* | 9/2022 | Bergman ................ | G10L 15/26 |
| 2022/0358903 A1* | 11/2022 | Serebryakov ......... | G10L 13/033 |

* cited by examiner

*Primary Examiner* — Thierry L Pham
(74) *Attorney, Agent, or Firm* — Esplin & Associates, PC

(57) ABSTRACT

Systems and methods to improve automatic speech recognition of audio data are disclosed. Exemplary implementations may: process a first noisy audio data from a set of the noisy audio data, with a generator, to generate first refined audio data; process the first refined audio data and a first comprehensible audio data from a set of the comprehensible audio data, individually with a discriminator, to determine individual decision values; determine a generator update and a discriminator update based on the individual decision values; apply the generator update to the generator such that the generator is modified to improve generation of refined audio data or is not modified; and apply the discriminator update to the discriminator such that the discriminator is modified to improve subsequent determinations of the decision values or is not modified.

18 Claims, 3 Drawing Sheets

SYSTEMS AND METHODS TO IMPROVE AUTOMATIC SPEECH RECOGNITION OF AUDIO DATA

FIELD OF THE DISCLOSURE

The present disclosure relates to systems and methods to improve automatic speech recognition of audio data.

BACKGROUND

There are existing systems that artificially generate realistic images based on real low-quality images using neural networks such as a generative adversarial network (GAN). However, GANs currently trained and used are limited to generating images based on the real low-quality images while GANs may be further utilized for other media such as audio data.

SUMMARY

One aspect of the present disclosure relates to a system configured to improve automatic speech recognition of raw low-quality audio data. Speech included in audio data could be difficult to recognize or interpret due to flaws and noises such as accents, speech impediments, language difficulties, background noises (e.g., other voices, machinery, etc.), and/or other flaws and noises. Further, performing speech recognition techniques on the audio data could be inaccurate due to the flaws and the noises. Existing speech recognition system do not utilize neural networks to improve speech quality and recognition quality for audio data with the flaws and noises.

The system described herein may train a generator and a discriminator (e.g., a GAN for audio data). The generator may generate refined audio data based on noisy audio data that includes the flaws and noises such that the refined audio data include less of the flaws and noises. The discriminator may obtain various audio data, including comprehensive audio data that do not include the flaws nor noises and the refined audio data, and determine decision values. The decision values may represent whether the discriminator determines whether a given audio data includes a high degree of the flaws and noise and therefore may be artificially generated by the generator, or includes minimal or a lack of the flaws and noise and therefore may not be artificially generated by the generator. Updates to the generator and the discriminator may be determined based on the decision values. The updates may improve the generator's subsequent generation of other refined audio data such that the removal or minimization of the flaws and/or noises is improved. The updates may improve the discriminator's subsequent accuracy of the decision values determined. Upon determination that there are no further updates to the generator, training may be completed, and utilization of the generator may occur. The generator may be used to enhance raw audio data, provided to the generator, that include the flaws and/or noises to generate enhances audio data that are comprehensible and recognizable by users and/or speech recognition systems.

The system may include one or more hardware processors configured by machine-readable instructions, electronic storage, and/or other elements. The electronic storage may store a set of noisy audio data and a set of comprehensible audio data. Individual ones of the noisy audio data in the set of the noisy audio data may represent recorded sound that includes both speech with a high degree of flaws and a high degree of noise. Individual ones of the set of comprehensible audio data may represent recorded sound that includes speech without the flaws and without the noise.

The machine-readable instructions may include one or more instruction components. The instruction components may include computer program components. The instruction components may include one or more of generator processing component, discriminator processing component, update determination component, generator updating component, discriminator updating component, and/or other instruction components.

The generator processing component may be configured to process a first noisy audio data from the set of the noisy audio data, with a generator, to generate first refined audio data. The first refined audio data may represent sound that includes speech present in the sound represented by the first noisy audio data with a lesser degree of the flaws and the noise of a lesser degree than the sound represented by the first noisy audio data. The first refined audio data may be correlated with the first noisy audio data.

The discriminator processing component may be configured to process the first refined audio data and a first comprehensible audio data from the set of the comprehensible audio data, individually with a discriminator, to determine individual decision values. The decision value may quantify comprehensibility of the speech and/or a minimal degree of or lack of the noises.

The update determination component may be configured to determine a generator update and a discriminator update based on the individual decision values.

The generator updating component may be configured to apply the generator update to the generator such that the generator is modified to improve generation of refined audio data or is not modified.

The discriminator updating component may be configured to apply the discriminator update to the discriminator such that the discriminator is modified to improve subsequent determinations of the decision values or is not modified.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
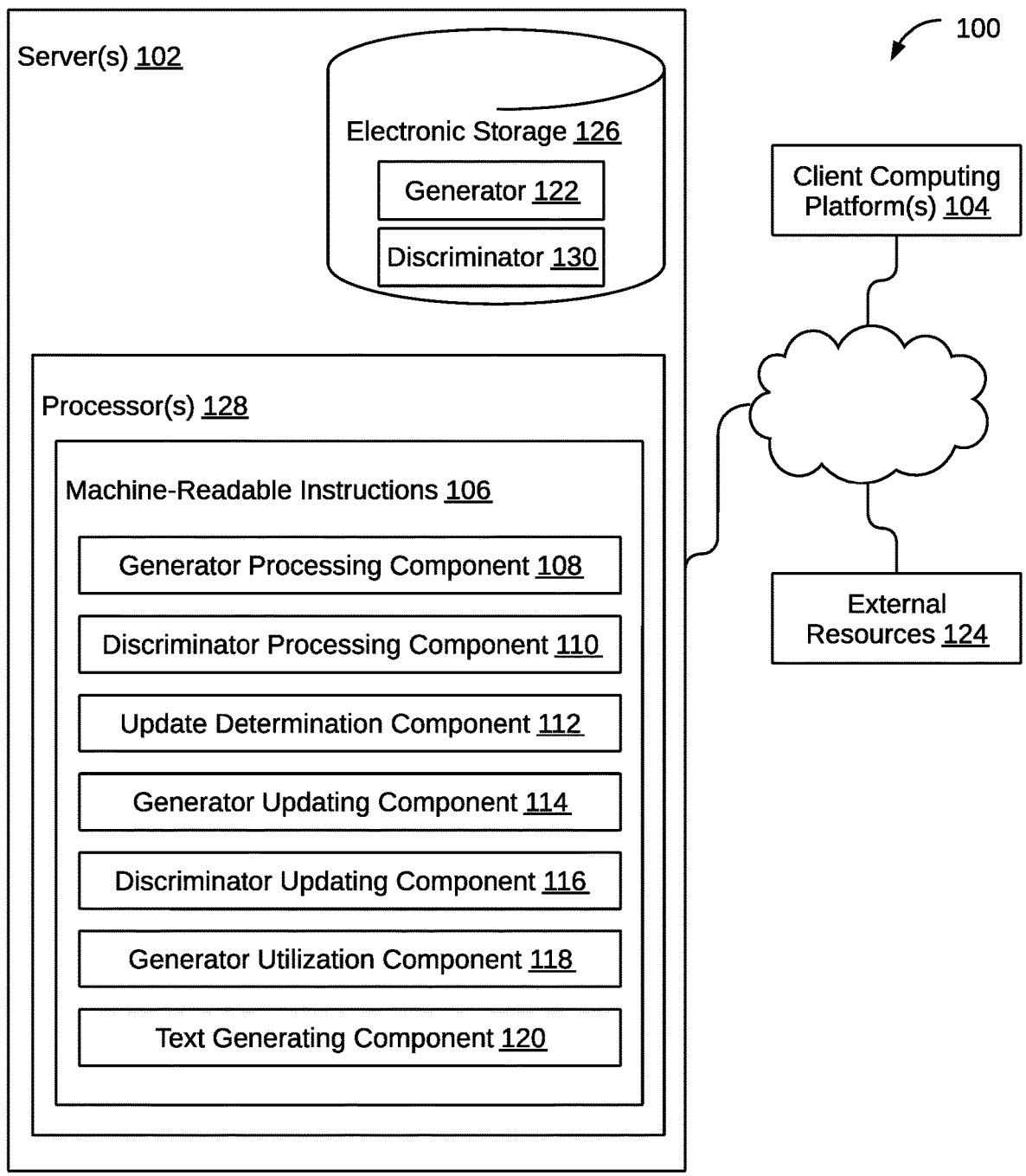
FIG. 1 illustrates a system configured to improve automatic speech recognition of audio data, in accordance with one or more implementations.

FIG. 1 illustrates a system 100 configured to improve automatic speech recognition of audio data, in accordance with one or more implementations. It is to be understood that system 100 described herein may be used to improve audio data so that the improved audio data may be applied or utilized in various ways and industries. The application of system 100 to particularly improve automatic speech recognition is not intended to be limiting as other applications and utilizations of improved audio data may be contemplated. By way of non-limiting example, improved audio data may be utilized by translation systems, voicemail systems, voice note taking systems, among others. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Electronic storage 126 may store a set of noisy audio data, a set of comprehensible audio data, a generator 122, a discriminator 130, and/or other information. As used herein, the term "audio data" and variations thereof, may refer to one or more electronic files that include information representing, characterizing, describing, or otherwise related to a single capture of sound (e.g., from a capture beginning to a capture end), or from multiple captures edited to be played back as a cohesive unit. The multiple captures edited into a cohesive unit may have an edited capture beginning to an edited capture end.

Individual ones of the noisy audio data in the set of the noisy audio data may represent recorded sound that includes both speech with a high degree of flaws and a high degree of noise. Individual ones of the set of comprehensible audio data may represent recorded sound that includes speech without the flaws and without the noise. The flaws in the speech may include accents, speech impediments, language inconsistencies, multiple pauses, multiple speech fillers, and/or other flaws. The language inconsistencies may include incorrect grammar such as use of a verb in present tense rather than in an appropriate past tense. Individual ones of the multiple pauses may be in between words or sentences. The speech fillers may include utterance of "uh", "um", "like", and/or other speech fillers. The noises may include ambient voices, ambient music, ambient traffic noises, ambient machine noises, static noises (e.g., from poor quality sound capture), and/or other noises. For example, the ambient machine noises may be a computer fan running, clicking of keyboard keys, clicking of buttons on a computer mouse, noises generated by the computer (e.g., notification noises), other computer noises, and/or other machine noises.

In some implementations, the high degree of the flaws and the high degree of the noise may refer to a quantification of the flaws and the noise, respectively, with respect to other audio data in electronic storage 126. In some implementations, the high degree of the flaws and/or the noise may be based on a fixed range that ranges from a low degree to the high degree. In some implementations, the high degree of the noise may be determined based on a threshold within the fixed range. That is, upon a volume level of a given audio data at any given point in time, or other value that is based on the sound signal amplitude, reaches or surpasses the threshold may qualify the given audio data as having a high degree of the noise. In some implementations, the high degree of the flaws may be determined based on speech recognition system, known or novel, failing to recognize a consistent or complete sentence and/or phrase.

Individual ones of the comprehensible audio data in the set of comprehensible audio data may represent sound that includes speech that is comprehensible due to the lack of the flaws and the noise. That is, the individual comprehensible audio data may be absence of, for example, accents, the ambient music, the ambient traffic noises, among other flaws and/or noises. The degrees of noise and/or the degrees of flaws for the set of the comprehensible audio data may be less than the set of the noisy audio data, such as a first refined audio data described herein.

Server(s) 102 may be configured by machine-readable instructions 106. Machine-readable instructions 106 may include one or more instruction components. The instruction components may include computer program components. The instruction components may include one or more of generator processing component 108, discriminator processing component 110, update determination component 112, generator updating component 114, discriminator updating component 116, generator utilization component 118, text generating component 120, and/or other instruction components.

Generator processing component 108 may be configured to process the individual noisy audio data from the set of the noisy audio data, with generator 122, to generate correlated refined audio data. In some implementations, generator processing component 108 may be configured to initiate generator 122 to process the individual noisy audio data and generate the refined audio data. The refined audio data generated by generator 122 may be improved versions of the correlated noisy audio data. That is, at least some of the flaws and at least some of the noise included in the noisy audio data may be removed or at least minimized. Generator 122 may comprise of values to weight parameters, one or more algorithms, known and/or novel, that are configured to refine and improve the noisy audio data, and/or other information. The values to the weight parameters for generator 122 may be utilized or otherwise applied to the one or more algorithms to adjust computations of the one or more algorithms. Adjusting the computations may update how generator 122 generates the refined audio data based on the noisy audio data, and thus improve generation of the refined audio data based on the noisy audio data by improving removal and/or minimization of the flaws and/or noise in the noisy audio data.

In some implementations, the refined audio data may subsequently be one of the noisy audio data that generator 122 processes. Thus, a single audio data may be processed and refined more than once. In some implementations, upon determination by a discriminator 130 that the same single audio data may not be generated by generator 122, described herein, such audio data may not be reprocessed and further refined by generator 122. In some implementations, the individual noisy audio data may only be processed and refined by generator 122 once.

By way of non-limiting example, a first noisy audio data from the set of the noisy audio data may be processed with generator 122 to generate first refined audio data. The first refined audio data may be correlated with the first noisy audio data. The first refined audio data may represent sound that includes speech present in the sound represented by the first noisy audio data with a lesser degree of the flaws and the noise of a lesser degree than the sound represented by the first noisy audio data. The first refined audio data and other refined audio data generated by generator 122 may be stored in electronic storage 134 in correlation with the noisy audio data they are based on.

As another example, generator processing component 108 may be configured to process second noisy audio data from the set of the noisy audio data, with generator 122, to generate second refined audio data. The second refined audio data may represent sound that includes speech present in the sound represented by the second noisy audio data with a lesser degree of the flaws and the noise of a lesser degree than the sound represented by the second noisy audio data.

As another example, generator processing component 108 may be configured to process third noisy audio data from the set of the noisy audio data, with generator 122, to generate third refined audio data. The third refined audio data may represent sound that includes speech present in the sound represented by the third noisy audio data with a lesser degree of the flaws and the noise of a lesser degree than the sound represented by the third noisy audio data.

Discriminator processing component 110 may be configured to process individual ones of the refined audio data correlated to the individual noisy audio data, individual ones of the comprehensible audio data from the set of comprehensible audio data, and/or other audio data, with discriminator 130, to determine individual decision values. In some implementations, discriminator processing component 110 may be configured to initiate discriminator 130 to determine the decision values for the individual refined audio data, the individual comprehensible audio data, and/or other audio data by analyzing such. Discriminator 130 may be configured to analyze the individual refined audio data and the individual comprehensible audio data to determine whether the speech included in each is comprehensible with at least a minimal degree of the flaws and/or a minimal degree of the noise. Discriminator 130 may comprise of values to weight parameters for discriminator 130, one or more algorithms, known and/or novel, that are configured to perform such analysis. The values to the weight parameters for discriminator 130 may be utilized or otherwise applied to the one or more algorithms to adjust computations of the one or more algorithms.

The minimal degrees of the flaws and/or the noise may be in relation to other audio data in electronic storage 126. The minimal degrees of the flaws and/or the noise may be degrees that are closer or more similar to the degrees of the comprehensible audio data and less similar to the noisy audio data. Discriminator 130 may output the decision values which represent and thus quantify comprehensibility of the speech (i.e., the flaws within the speech) and/or the minimal degree of or lack of the noises. That is, discriminator 130 may determine whether a given audio data is artificially generated by generator 130 or not such that the determination is represented by the decision values determined.

A decision value that represents a determination that a given audio data is generated by generator 122 may indicate that the given audio data includes a particular degree of the flaws and/or a particular degree of the noise. The particular degrees of the flaws and/or the noises may be integrated into and known by discriminator 130 so that discriminator 130 may determine whether the particular degrees of the flaws and/or the noises are met. A decision value that represents a determination that the given audio data is not generated by generator 122, whether the given audio data was generated by generator 122 or not, may indicate that the degrees of the flaws and/or the noises is less than the particular degrees, and thus the flaws and/or the noises are minimal or absent. The decision values may be a number between zero and one, a number between two other numbers, a percentage, a letter score, and/or other value type.

By way of non-limiting example, the first refined audio data, a first comprehensible audio data from the set of the comprehensible audio data, and/or other files may be processed, individually with discriminator 130, to determine the individual decision values. As another example, the second refined audio data, the third refined audio data, and/or other files may be processed, individually with discriminator 130, to determine a second decision value, a third decision value, and/or other decision values, respectively. The decision values determined may include the second decision value, the third decision value, and/or other decision values for the audio data processed using discriminator 130.

For example, the second decision value may indicate a presence or the particular degrees of the flaws and/or the noises such that discriminator 130, correctly, determined that the second refined audio data is a generated file generated by generator 122. This second decision value may indicate that generator 122 does require updating for improvements. The third decision value may indicate i) a lack of the flaws or a low degree of the flaws and/or ii) a lack of the noise or a low degree of the noise such that discriminator 130, incorrectly, determined that the third refined audio data is not a generated by generator 122 and may be one of the comprehensible audio data. This third decision value may indicate that generator 122 does not require updating because generator 122 generated the third refined audio data to be comprehensible with at least minimal flaws and/or noise.

Update determination component 112 may be configured to determine generator updates and discriminator updates based on the individual decision values. Generator updates may include adjustments to the values that define the weight parameters of generator 122 to therefore adjust and improve how generator 122 generates subsequent refined audio data based on the noisy audio data. Discriminator updates may include adjustments to the values that define the weight parameters of discriminator 130 to therefore adjust and improve subsequent determinations of whether a given audio data is generated by generator 122 or not, which are represented by the decision values determined and output by discriminator 130.

For example, update determination component 112 may be configured to determine a second generator update and a second discriminator update based on the second decision value. Due to the second decision value representing a determination that the second refined audio data was generated by generator 122, and thus indicating that generator 122 required improvement in generation of refined audio data, the second generator update may include adjustments to the values that define the weight parameters for generator 122. Furthermore, the second discriminator update may include no update to discriminator 130.

As another example, update determination component 112 may be configured to determine a third generator update and a third discriminator update based on the third decision value. Due to the third decision value representing a determination that the third refined audio data was not generated by generator 122, though it was, thus indicating that generator 122 need no further updates for improvement for subsequent generation of the refined audio data, the third generator update may include no update or adjustments to the values to the weight parameters for generator 122. Furthermore, the third discriminator update may include adjustments to the values for the weight parameters of discriminator 130 to improve subsequent determinations of decision values. The generator updates may include the second generator update, the third generator update, and/or other generator updates. The discriminator updates may include the second discriminator update, the third discriminator update, and/or other generator updates.

Generator updating component 114 may be configured to apply the generator updates to generator 122 such that generator 122 is modified to improve generation of refined audio data or is not modified. That is, modifying generator 122 based on applying the generator updates may include adjusting the values to the weight parameters of generator 122, which were determined based on the individual decision values to improve the removal or minimization of the flaws and/or noise in the noisy audio data received by generator 122. For example, generator updating component 114 may be configured to apply the second generator update to generator 122 such that the values to the weight parameter for generator 122 are adjusted. Thus, generator 122 is modified to improve generation of the refined audio data. Applying third generator update, i.e., no update, to generator 122 may cause no adjustments to the values to the weight parameters of generator 122.

Discriminator updating component 116 may be configured to apply the discriminator updates to discriminator 130 such that discriminator 130 is modified to improve subsequent determinations of the decision values or is not modified. That is, modifying discriminator 130 based on applying the discriminator updates may include adjusting the values to the weight parameters of discriminator 130, which were determined based on the individual decision values to improve subsequent accuracy of the decision values determined. For example, discriminator updating component 116 may be configured to apply the third discriminator update to discriminator 130 such that the values to the weight parameter for discriminator 130 are adjusted. As such, discriminator 130 is modified to improve subsequent determinations of the decision values. Applying second discriminator update, i.e., no update, to discriminator 130 may cause no adjustments to the values to the weight parameters of discriminator 130.

The description of system 100 up to this point describes training of generator 122 and discriminator 130. Upon no further determinations of the generator updates and the discriminator updates to apply, the training ceases and utilization of generator 122 may occur. Generator 122 may be utilized to generate enhanced audio data based on captured or input raw audio data that may be incomprehensible with regards to the flaws and/or the noises present, and therefore may require refinement. The enhanced audio data generated by generator 122 may be improved versions of the raw audio data, similar to the refined audio data described herein, such that user(s) may consume the enhanced audio data with ease.

Generator utilization component 118 may be configured to obtain raw audio data that represents sounds that include speech of a user with the high degree of the flaws and the high degree of the noise. The raw audio data may be captured via an audio section included in client computing platform 104 associated with the user or uploaded via client computing platform 104. The audio section may include a microphone, a speaker, and/or other audio components that facilitate with capturing the raw audio data and presenting/playing any audio data. By way of non-limiting example, the speech of the user may include a lecture for a course.

Generator utilization component 118 may be configured to generate an enhanced audio data based on the raw audio data and by utilizing generator 122. That is, the raw audio data may be transmitted to generator 122 as input, and subsequently, the enhanced audio data may be generated. The enhanced audio data may be correlated to the raw audio data. In some implementations, the enhanced audio data may be stored to electronic storage 126 and/or other storage media. In some implementations, the enhanced audio data may be presented or played via the audio section.

In some implementations, text generating component 120 may be configured to generate text based on the enhanced audio data. The text may be generated by employing known and/or novel speech recognition techniques. The text may be presented via client computing platform 104 for the user. In some implementations, the text may be stored in electronic storage 126 and/or other storage media in correlation to the enhanced audio data.

Figure 3:
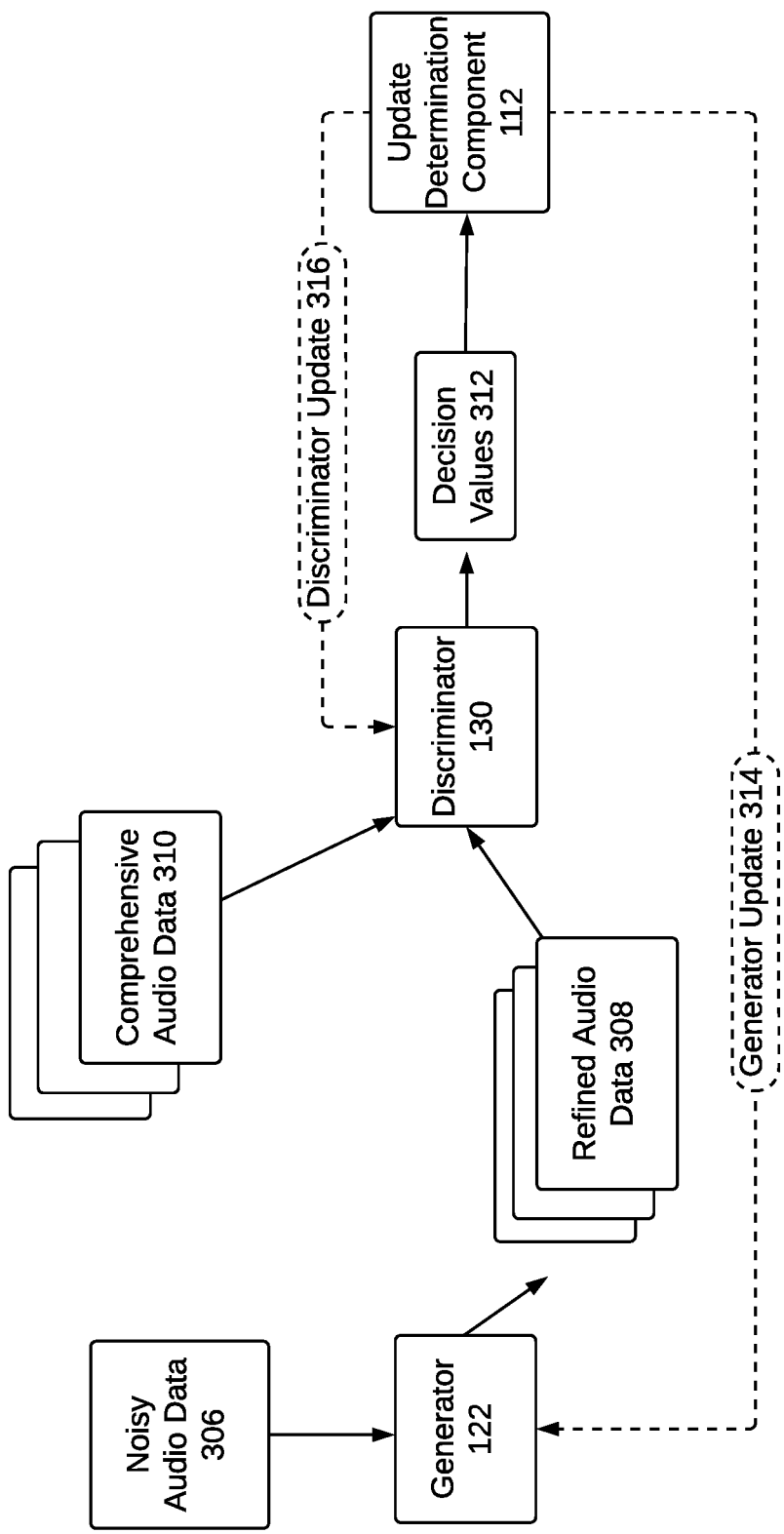
FIG. 3 illustrates an example implementation of the system configured to improve automatic speech recognition of audio data, in accordance with one or more implementations.

FIG. 3 illustrates an example implementation, in accordance with one or more implementations described herein. FIG. 3 illustrates a generator 122 and a discriminator 130, the same as in FIG. 1. Noisy audio data 306 that represent recorded sound that includes both speech with a high degree of flaws and a high degree of noise may be input to generator 122. Generator 122 may generate refined audio data 308. Refined audio data 308 may represent sounds that include the speech from noisy audio data 306 with a lesser degree of the flaws and a lesser degree of the noise than noisy audio data 306. Subsequently, refined audio data 308 and comprehensive audio data 310 may be input to discriminator 130. Discriminator 130 may individually process refined audio data 308 and comprehensive audio data 310 to determine decision values 312. Decision values 312 may quantify or otherwise represent whether the speech in the individual files is comprehensible, and/or has a minimal degree of the noises or lacks the noises, and thus whether a given audio data is artificially generated by generator 122 or not. Decision values 312 may be input to update determination component 112 (the same as in FIG. 1) that determines generator updates 314 for generator 122 and discriminator updates 316 for discriminator 130. Generator updates 314 may be applied to generator 122 to improve subsequent generation of other refined audio data. Discriminator updates 316 may be applied to discriminator 130 to improve determination of other decision values, i.e., determine whether a given file (such as a comprehensive audio data) is comprehensible with lack of or minimal noises such that it may not be generated by generator 122.

In some implementations, server(s) 102, client computing platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 124 may be operatively linked via some other communication media.

A given client computing platform 104 may include one or more processors configured to execute computer program components. The computer program components may be configured to enable an expert or user associated with the given client computing platform 104 to interface with system 100 and/or external resources 124, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 124 may include sources of information outside of system 100, external entities participating with system 100, and/or other resources. In some implementations, some or all of the functionality attributed herein to external resources 124 may be provided by resources included in system 100.

Server(s) 102 may include electronic storage 126, one or more processors 128, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 126 may comprise non-transitory storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from server(s) 102, information received from client computing platform(s) 104, and/or other information that enables server(s) 102 to function as described herein.

Processor(s) 128 may be configured to provide information processing capabilities in server(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 128 may represent processing functionality of a plurality of devices operating in coordination. Processor(s) 128 may be configured to execute components 108, 110, 112, 114, 116, 118, and/or 120, and/or other components. Processor(s) 128 may be configured to execute components 108, 110, 112, 114, 116, 118, and/or 120, and/or other components by software; hardware; firmware; some combination of software, hardware, and/or firmware; and/or other mechanisms for configuring processing capabilities on processor(s) 128. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, and/or 120 are illustrated in FIG. 1 as being implemented within a single processing unit, in implementations in which processor(s) 128 includes multiple processing units, one or more of components 108, 110, 112, 114, 116, 118, and/or 120 may be implemented remotely from the other components. The description of the functionality provided by the different components 108, 110, 112, 114, 116, 118, and/or 120 described below is for illustrative purposes, and is not intended to be limiting, as any of components 108, 110, 112, 114, 116, 118, and/or 120 may provide more or less functionality than is described. For example, one or more of components 108, 110, 112, 114, 116, 118, and/or 120 may be eliminated, and some or all of its functionality may be provided by other ones of components 108, 110, 112, 114, 116, 118, and/or 120. As another example, processor(s) 128 may be configured to execute one or more additional components that may perform some or all of the functionality attributed below to one of components 108, 110, 112, 114, 116, 118, and/or 120.

Figure 2:
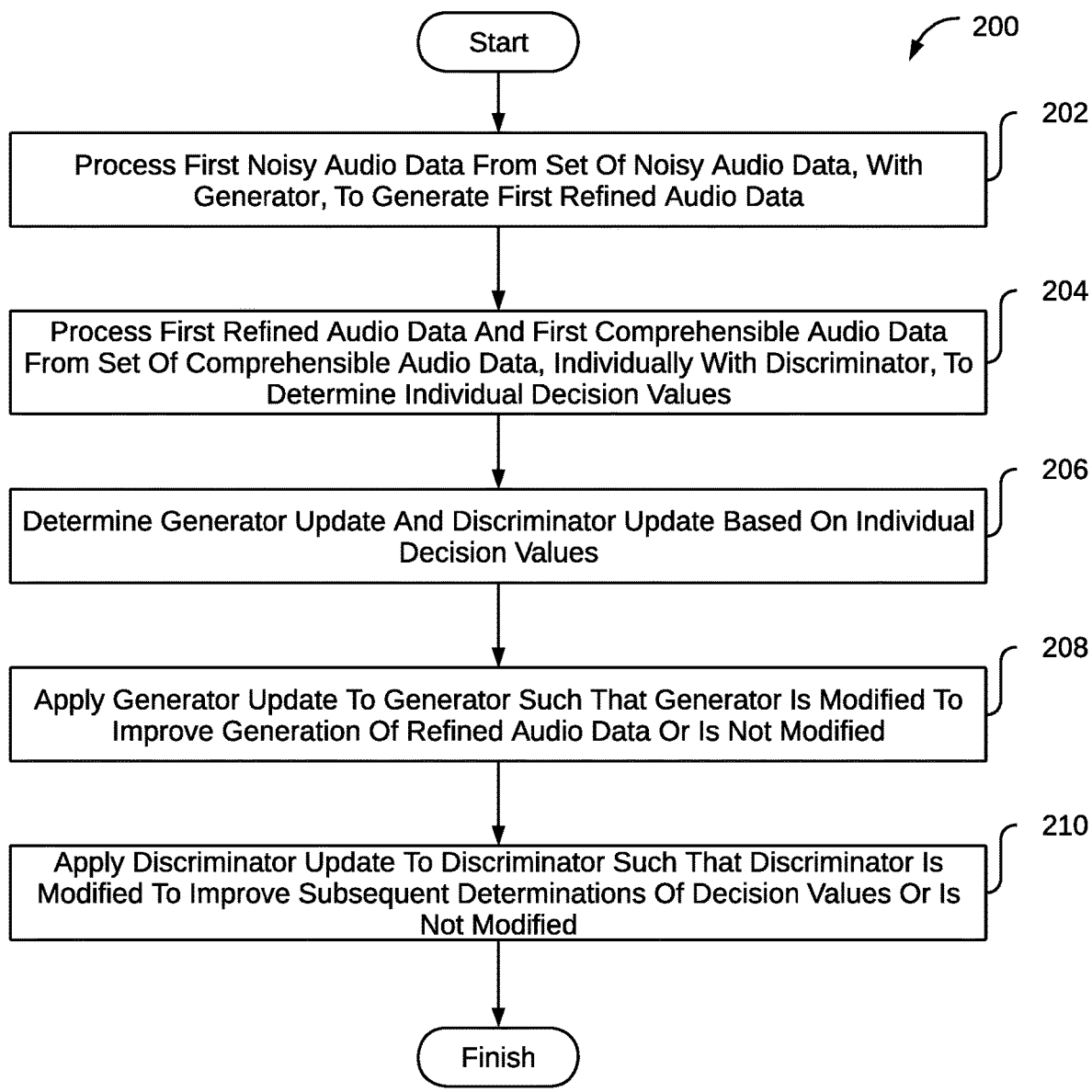
FIG. 2 illustrates a method to improve automatic speech recognition of audio data, in accordance with one or more implementations.

FIG. 2 illustrates a method 200 to improve automatic speech recognition of audio data, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include processing a first noisy audio data from a set of the noisy audio data, with a generator, to generate first refined audio data. The set of the noisy audio data may be stored in electronic storage. The electronic storage may store a set of comprehensible audio data. Individual ones of the noisy audio data in the set of the noisy audio data may represent recorded sound that includes both speech with a high degree of flaws and a high degree of noise. Individual ones of the set of comprehensible audio data may represent recorded sound that includes speech without the flaws and without the noise. The first refined audio data may represent sound that includes speech present in the sound represented by the first noisy audio data with a lesser degree of the flaws and the noise of a lesser degree than the sound represented by the first noisy audio data. The first refined audio data may be correlated with the first noisy audio data. Operation 202 may be performed by one or more hardware processors configured by machine-readable instructions including a component that is the same as or similar to generator processing component 108, in accordance with one or more implementations.

An operation 204 may include processing the first refined audio data and a first comprehensible audio data from the set of the comprehensible audio data, individually with a discriminator, to determine individual decision values. The decision may value quantify comprehensibility of the speech and/or a minimal degree of or lack of the noises. Operation 204 may be performed by one or more hardware processors configured by machine-readable instructions including a component that is the same as or similar to discriminator processing component 110, in accordance with one or more implementations.

An operation 206 may include determining a generator update and a discriminator update based on the individual decision values. Operation 206 may be performed by one or more hardware processors configured by machine-readable instructions including a component that is the same as or similar to update determination component 112, in accordance with one or more implementations.

An operation 208 may include applying the generator update to the generator such that the generator is modified to improve generation of refined audio data or is not modified. Operation 208 may be performed by one or more hardware processors configured by machine-readable instructions including a component that is the same as or similar to generator updating component 114, in accordance with one or more implementations.

An operation 210 may include applying the discriminator update to the discriminator such that the discriminator is modified to improve subsequent determinations of the decision values or is not modified. Operation 210 may be performed by one or more hardware processors configured by machine-readable instructions including a component that is the same as or similar to discriminator updating component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to improve automatic speech recognition of audio data, the system comprising:
    electronic storage that stores a set of noisy audio data and a set of comprehensible audio data, wherein individual ones of the noisy audio data in the set of the noisy audio data represent recorded sound that includes both speech with a high degree of flaws and a high degree of noise, the flaws in the speech including pauses and speech fillers, the noises including ambient computer noises, wherein individual ones of the set of comprehensible audio data represent recorded sound that includes speech without the flaws and without the noise; and
    one or more processors configured by machine-readable instructions to:
        process a first noisy audio data from the set of the noisy audio data, with a generator, to generate first refined audio data, wherein the first refined audio data represents sound that includes speech present in the sound represented by the first noisy audio data with a lesser degree of the flaws and the noise of a lesser degree than the sound represented by the first noisy audio data, the sound represented by the first refined audio data including fewer of the pauses, the speech fillers, and the ambient computer noises than the sound represented by the first noisy audio data, wherein the first refined audio data is correlated with the first noisy audio data;
        process i) the first refined audio data and ii) a first comprehensible audio data from the set of the comprehensible audio data, individually with a discriminator, to determine individual decision values, wherein the decision values quantify comprehensibility of the speech and/or a minimal degree of or lack of the noises;
        determine a generator update and a discriminator update based on the individual decision values;
        apply the generator update to the generator such that the generator is modified to improve generation of refined audio data or is not modified; and
        apply the discriminator update to the discriminator such that the discriminator is modified to improve subsequent determinations of the decision values or is not modified.

2. The system of claim 1, wherein the flaws in the speech further include accents, speech impediments, and/or language inconsistencies.

3. The system of claim 1, wherein the noises further include ambient voices, ambient music, and/or ambient traffic noises.

4. The system of claim 1, wherein the degrees of noise for the set of the comprehensible audio data are less than the first refined audio data.

5. The system of claim 1, wherein the one or more processors are further configured by the machine-readable instructions to:
    process second noisy audio data from the set of the noisy audio data, with the generator, to generate second refined audio data, wherein the second refined audio data represents sound that includes speech present in the sound represented by the second noisy audio data with a lesser degree of the flaws and the noise of a lesser degree than the sound represented by the second noisy audio data, the sound represented by the second refined audio data including fewer of the pauses, the speech fillers, and the ambient computer noises than the sound represented by the second noisy audio data;
    process the second refined audio data with the discriminator to determine a second decision value, wherein the decision values include the second decision value;
    determine a second generator update and a second discriminator update based on the second decision value, wherein the second discriminator update includes no update; and
    apply the second generator update to the generator such that the generator is modified to improve generation of the refined audio data.

6. The system of claim 1, wherein the one or more processors are further configured by the machine-readable instructions to:

process third noisy audio data from the set of the noisy audio data, with the generator, to generate third refined audio data, wherein the third refined audio data represents sound that includes speech present in the sound represented by the third noisy audio data with a lesser degree of the flaws and the noise of a lesser degree than the sound represented by the third noisy audio data, the sound represented by the third refined audio data including fewer of the pauses, the speech fillers, and the ambient computer noises than the sound represented by the third noisy audio data;

process the third refined audio data with the discriminator to determine a third decision value, wherein the third decision value indicates i) a lack of the flaws or a low degree of the flaws and/or ii) a lack of the noise or a low degree of the noise such that the generator does not require updating;

determine a third generator update and a third discriminator update based on the third decision value, wherein the third generator update includes no update; and apply the third discriminator update to the discriminator such that the discriminator is modified to improve subsequent determinations of the decision values.

7. The system of claim 1, wherein modifying the generator based on applying generator updates includes adjusting values to weight parameters based on the individual decision values.

8. The system of claim 1, wherein modifying the discriminator based on applying discriminator updates includes adjusting values to weight parameters based on the individual decision values.

9. A system configured to utilize a generator to improve automatic speech recognition of audio data, the system comprising:
 a generator configured to generate enhanced audio data that are comprehensible with at least minimal flaws and/or noise based on raw audio data, the flaws including pauses and speech fillers, the noises including ambient computer noises; and
 one or more processors configured by machine-readable instructions to:
  obtain raw audio data that represents sounds that include speech of a user with a degree of the flaws and a degree of the noise, wherein the raw audio data is captured via an audio section included in a client computing platform;
  generate an enhanced audio data based on the raw audio data and by utilizing the generator such that the raw audio data is transmitted to the generator as input, the enhanced audio data representing sound that include the speech of the user with a lesser degree of the flaws and a lesser degree of the noise than the sound represented by the raw audio data, the sound represented by the enhanced audio data including fewer of the pauses, the speech fillers, and the ambient computer noises than the sound represented by the raw audio data, wherein the enhanced audio data is correlated to the raw audio data; and
  generate and present text via the client computing platform based on the enhanced audio data.

10. A method to improve automatic speech recognition of audio data, the method comprising:
 processing a first noisy audio data from a set of noisy audio data, with a generator, to generate first refined audio data, wherein the set of the noisy audio data is stored in electronic storage, wherein the electronic storage stores a set of comprehensible audio data, wherein individual ones of the noisy audio data in the set of the noisy audio data represent recorded sound that includes both speech with a high degree of flaws and a high degree of noise, the flaws in the speech including pauses and speech fillers, the noises including ambient computer noises, wherein individual ones of the set of comprehensible audio data represent recorded sound that includes speech without the flaws and without the noise, wherein the first refined audio data represents sound that includes speech present in the sound represented by the first noisy audio data with a lesser degree of the flaws and the noise of a lesser degree than the sound represented by the first noisy audio data, the sound represented by the first refined audio data including fewer of the pauses, the speech fillers, and the ambient computer noises than the sound represented by the first noisy audio data, wherein the first refined audio data is correlated with the first noisy audio data;

processing i) the first refined audio data and ii) a first comprehensible audio data from the set of the comprehensible audio data, individually with a discriminator, to determine individual decision values, wherein the decision values quantify comprehensibility of the speech and/or a minimal degree of or lack of the noises;

determining a generator update and a discriminator update based on the individual decision values;

applying the generator update to the generator such that the generator is modified to improve generation of refined audio data or is not modified; and applying the discriminator update to the discriminator such that the discriminator is modified to improve subsequent determinations of the decision values or is not modified.

11. The method of claim 10, wherein the flaws in the speech further include accents, speech impediments, and/or language inconsistencies.

12. The method of claim 10, wherein the noises further include ambient voices, ambient music, and/or ambient traffic noises.

13. The method of claim 10, wherein the degrees of noise for the set of the comprehensible audio data are less than the first refined audio data.

14. The method of claim 10, further comprising:
 processing second noisy audio data from the set of the noisy audio data, with the generator, to generate second refined audio data, wherein the second refined audio data represents sound that includes speech present in the sound represented by the second noisy audio data with a lesser degree of the flaws and the noise of a lesser degree than the sound represented by the second noisy audio data, the sound represented by the second refined audio data including fewer of the pauses, the speech fillers, and the ambient computer noises than the sound represented by the second noisy audio data;
 processing the second refined audio data with the discriminator to determine a second decision value, wherein the decision values include the second decision value;
 determining a second generator update and a second discriminator update based on the second decision value, wherein the second discriminator update includes no update; and
 applying the second generator update to the generator such that the generator is modified to improve generation of the refined audio data.

15. The method of claim 10, further comprising:
processing third noisy audio data from the set of the noisy audio data, with the generator, to generate third refined audio data, wherein the third refined audio data represents sound that includes speech present in the sound represented by the third noisy audio data with a lesser degree of the flaws and the noise of a lesser degree than the sound represented by the third noisy audio data, the sound represented by the third refined audio data including fewer of the pauses, the speech fillers, and the ambient computer noises than the sound represented by the third noisy audio data;

processing the third refined audio data with the discriminator to determine a third decision value, wherein the third decision value indicates i) a lack of the flaws or a low degree of the flaws and/or ii) a lack of the noise or a low degree of the noise such that the generator does not require updating;

determining a third generator update and a third discriminator update based on the third decision value, wherein the third generator update includes no update; and applying the third discriminator update to the discriminator such that the discriminator is modified to improve subsequent determinations of the decision values.

16. The method of claim 10, wherein modifying the generator based on applying generator updates includes adjusting values to weight parameters based on the individual decision values.

17. The method of claim 10, wherein modifying the discriminator based on applying discriminator updates includes adjusting values to weight parameters based on the individual decision values.

18. A method to utilize a generator to improve automatic speech recognition of audio data, the method comprising:

obtaining raw audio data that represents sounds that include speech of a user with a degree of flaws and a degree of noise, the flaws including pauses and speech fillers, the noises including ambient computer noises, wherein the raw audio data is captured via an audio section included in a client computing platform;

generating an enhanced audio data based on the raw audio data and by utilizing a generator, wherein the generator is configured to generate enhanced audio data that are comprehensible with at least minimal flaws and/or noise based on raw audio data, such that the raw audio data is transmitted to the generator as input, the enhanced audio data representing sound that include the speech of the user with a lesser degree of the flaws and a lesser degree of the noise than the sound represented by the raw audio data, the sound represented by the enhanced audio data including fewer of the pauses, the speech fillers, and the ambient computer noises than the sound represented by the raw audio data, wherein the enhanced audio data is correlated to the raw audio data; and generating and present text via the client computing platform based on the enhanced audio data.

* * * * *